May 27, 1969

K. H. MARSHALL 3,445,935

JIG TO BE USED IN DENTISTRY

Filed Feb. 6, 1968

May 27, 1969

K. H. MARSHALL 3,445,935

JIG TO BE USED IN DENTISTRY

Filed Feb. 6, 1968

May 27, 1969  K. H. MARSHALL  3,445,935
JIG TO BE USED IN DENTISTRY
Filed Feb. 6, 1968  Sheet 4 of 5
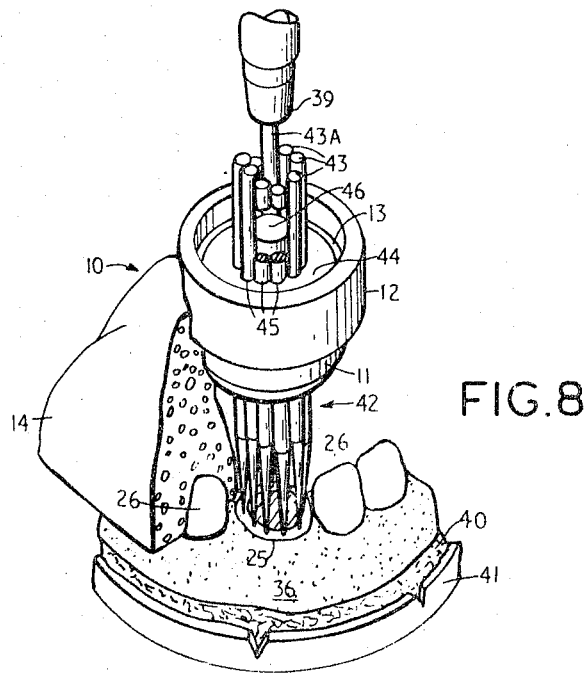
FIG. 8
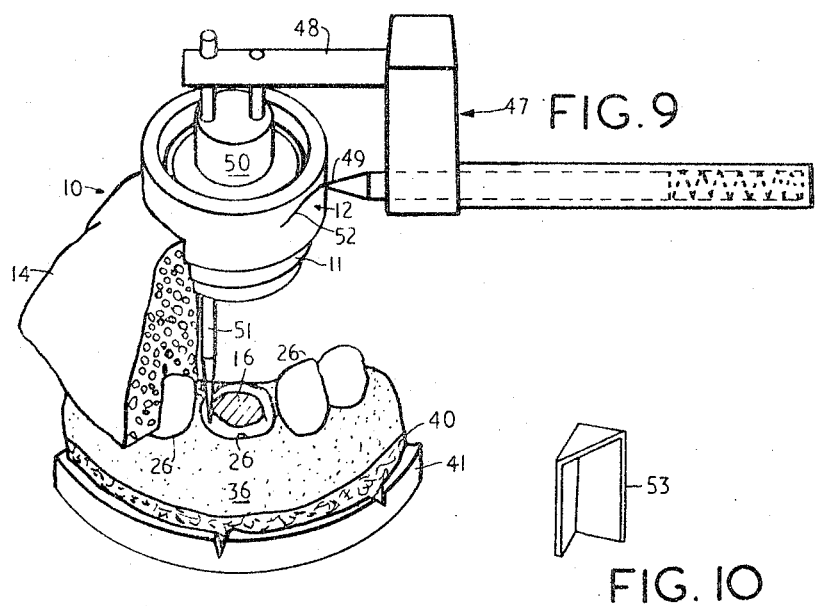
FIG. 9
FIG. 10

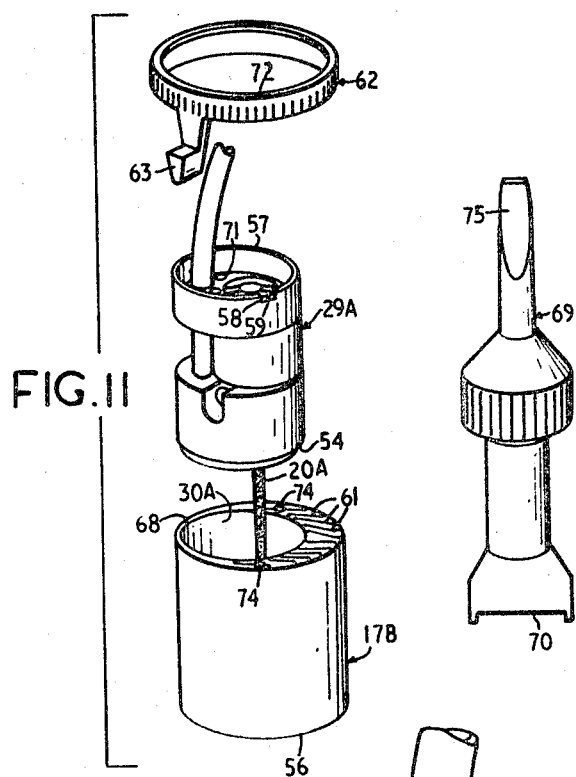
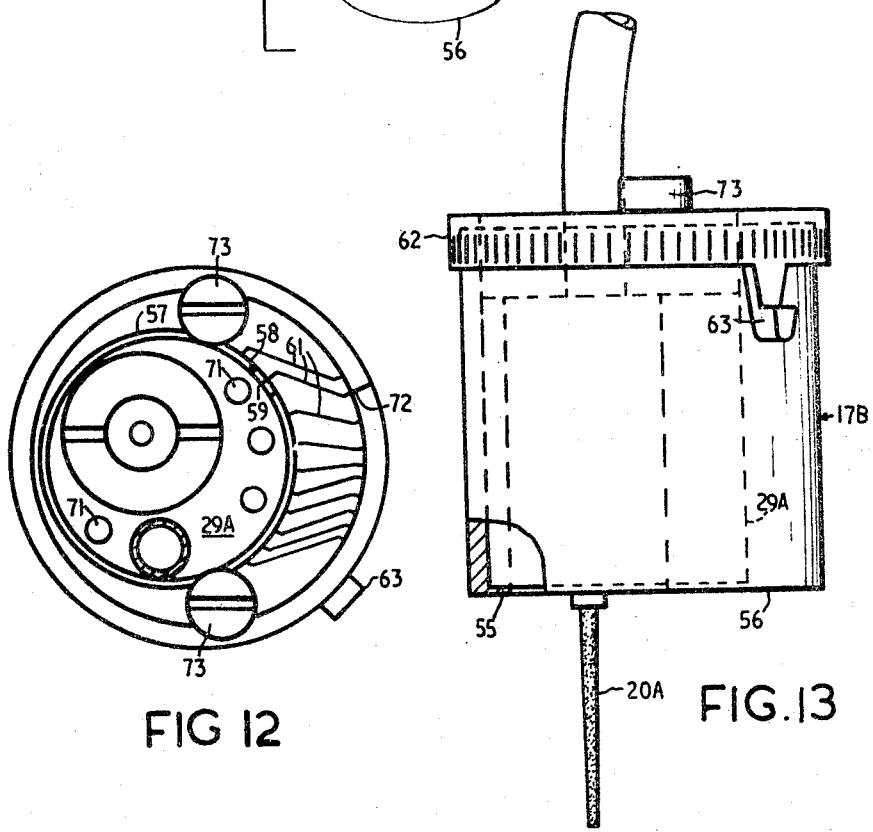

United States Patent Office 3,445,935
Patented May 27, 1969

3,445,935
JIG TO BE USED IN DENTISTRY
Kenneth H. Marshall, 85 The Bulwark, Castlecrag,
New South Wales, Australia
Filed Feb. 6, 1968, Ser. No. 703,360
Claims priority, application Australia, Mar. 21, 1967,
19,252/67
Int. Cl. A61c 3/00, 13/12
U.S. Cl. 32—40                                    16 Claims

ABSTRACT OF THE DISCLOSURE

The production of a dental drilling jig used for preparation of a tooth for a jacket crown or the like, which comprises a disposable assembly of a guide cylinder and surrounding stationary cam sleeve set together in a frame of self-setting material carrying teeth impression of the patient for positioning of the jig within the patient's mouth, and a barrel with an offset bore for carrying dental-drilling apparatus rotatable and slidable within the guide cylinder and controlled by the cam.

---

This invention relates to appliances such as jigs providing an aid to dentists in the preparation of teeth for the fitting of jacket crowns, for pin-lays, for pin-ledges, for three-quarter crowns, for bridge abutments and other applications.

The type of preparation to be selected will vary according to the dental treatment required but invariably the circumferential reduction of tooth structure is required to conform to an axis or axes approximately parallel with a predetermined axis known as the path of insertion. A slight taper is usually preferred to provide working draught. With the present day common usage of high speed drills very little resistance is provided by the tooth structure to cutting of the bur. As a result considerable skill is required of a dental surgeon in free-hand preparation of a tooth for, say, a jacket crown, particularly if reasonably accurate circumferential reduction is to be achieved and a uniform subgingival shoulder is to be produced. Care must also be exercised to avoid interference with the interproximal surfaces of approximating teeth. It is important that accurate preparatory work be undertaken if the final restoration is to be correctly shaped within the limits of the proper tooth contour. Greater difficulty still is entailed when the required dental treatment involves the restoration of several teeth by bridging technique.

Also, as it is not feasible for a dental surgeon to forecast precisely the dimensions of the reduced tooth, considerable chairside time is occupied in the preparation by the surgeon of a temporary crown after preparatory work.

It is the principal object of the invention to provide a device for use by a dental surgeon which will confine the movement of the cutting bur within predetermined limits relative to the tooth for treatment, thereby simplifying jacket crowns and other preparations.

Another object is to provide such a device which will accurately control two components of the bur movement, i.e., circumferential cutting and gingival cutting by the bur.

It is a further object to provide a method of producing a device of this kind which method is relatively simple and capable of control within very close tolerances.

In one general form of the invention there is provided a drilling jig for dental preparation comprising a guide cylinder, a rotatably slidable barrel carried within the guide cylinder, means for holding at least part of drilling apparatus in the barrel with its cutting bur extending in a line offset from the barrel axis, cam means fixed relatively with the guide cylinder, cam follower means carried by the barrel to limit the maximum extension of the bur beyond the guide cylinder in all positions of rotation of the barrel, and frame means connected with the guide cylinder to enable accurate positioning of the jig within the mouth of the patient.

In another general form the invention provides a method of producing a jig of the above kind comprising the steps of producing a study cast of the patient's mouth, orienting the cast on surveyor apparatus to a predetermined path of insertion, selecting a guide cylinder locating pin array appropriate to the intended circumferential preparation of the patient's tooth, locating a guide cylinder and cam device on the selected pin array forming a positioning overlay around some of the remaining teeth and on the guide cylinder to construct a jig frame of unitary construction, applying a stylus scribing device to the jig frame to trace the gingival margin of the tooth and simultaneously scribe the necessary contours of the cam, preparing the cam, and selecting an offset drilled barrel for the guide cylinder which barrel corresponds to the previously selected pin array.

A drilling jig of the above kind is precisely locatable within the mouth of a patient to receive at least part of drilling apparatus such as the nozzle of a handpiece or an entire high speed turbine unit, to permit the bur carried thereby only limited movement with respect to the tooth for preparation for a jacket crown. The bur will be permitted to circumscribe the tooth while maintaining an axis approximately parallel to a preselected path of insertion. Additionally, cutting of the gingival margin of the tooth to form a precise subgingival shoulder will also be controlled through the use of the drilling jig. Cutting of the incisal edge of the tooth may be achieved by known means such as a wheel stone, diamond cutter or the like either preceding or succeeding the preparatory work performed with the use of the jig, and reduction of the lingual surface is also done after the principal reduction using the jig.

A preferred form of the invention, in which the jig has been produced for preparation of a patient's upper right central tooth, is illustrated in the accompanying drawings, in which:

FIGURE 8 is a fragmentary perspective view of the sleeve being moulded about the pin array;

FIGURE 9 is a fragmentary perspective view showing the cam track being scribed;

FIGURE 10 is a perspective view of a bur setting tool;

FIGURE 11 is an exploded perspective view of the component parts of a third modified form of the barrel, to an enlarged scale;

FIGURE 12 is a plan view of the assembled barrel of FIGURE 11 to a still further enlarged scale; and FIGURE 13 is a side elevation of the barrel shown in FIGURE 12.

Figure 1:
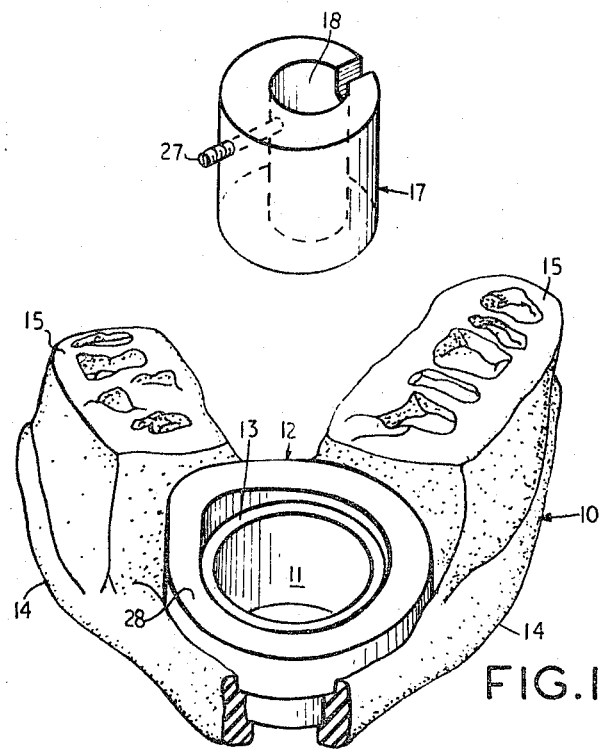
FIGURE 1 is an inverted plan view in perspective of the drilling jig showing the barrel displaced from its normal position.
Figure 2:
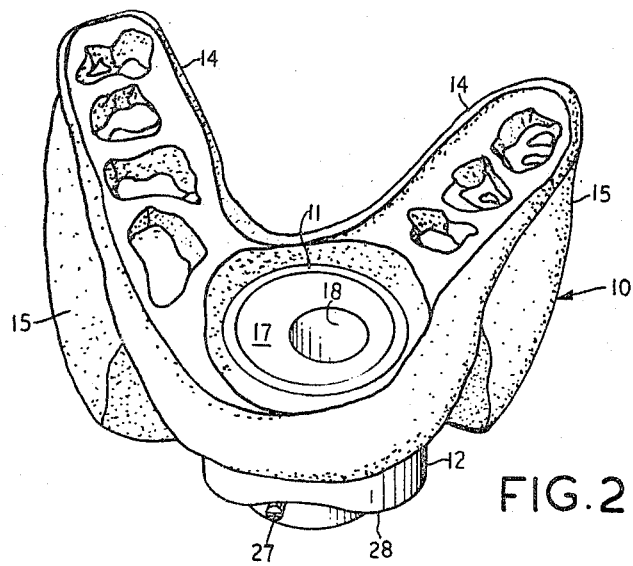
FIGURE 2 is a plan view in perspective of the jig shown in FIGURE 1, with the barrel inserted in its normal position.
Figure 3:
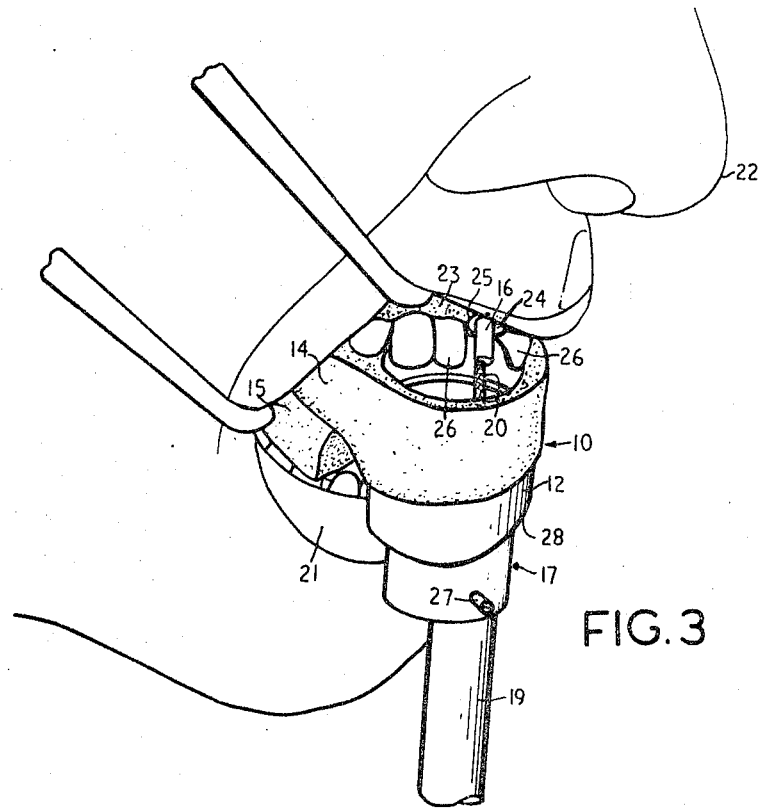
FIGURE 3 is a perspective view showing the jig in a patient's mouth.
Figure 4:
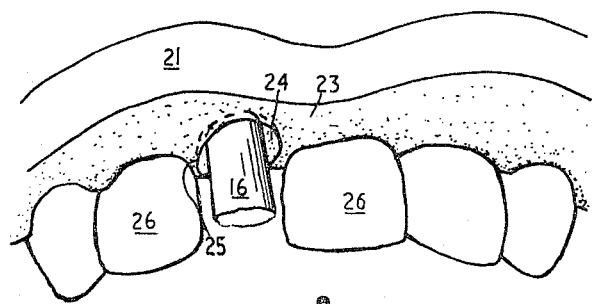
FIGURE 4 is a perspective view of a tooth that has been drilled in accordance with the invention.

With reference to FIGURES 1 to 3, preferably the drilling jig 10 consists of a tubular guide cylinder 11 upon which is snugly fitted a metal or plastics cylindrical sleeve 12 extending beyond an outer end 13 of the cylinder 11. Both the guide cylinder 11 and surrounding sleeve 12 are united with a locating frame 14 composed of a suitable autopolymerizing resin applied at least partly around the cylinder 11 and sleeve 12 assembly and has an overlay 15 moulded to contain an impression of the patient's teeth to either side of the tooth 16 to be prepared. Any fast-cure resin may be used to form the overlay 15 and to produce a unitary jig assembly comprised of the overlay 15, guide cylinder 11 and enclosing sleeve 12.

A metal or plastics barrel 17 is snugly and slidably positioned within the tubular guide cylinder 11. A longitudinal hole 18 is bored through the barrel 17 parallel with its axis but offset therefrom by a preselected amount. The hole 18 is of such diameter as to permit the stationary chuck or nozzle of a dental drill handpiece, described hereafter, to be located therein with the cutting bur 20 protruding beyond its inner end. The longitudinal axis of the guide cylinder 11, and thus the slidable barrel 17 is so arranged that upon location of the overlay 15 of the jig frame 14 within the mouth 21 of the patient 22, it is parallel to a path of insertion previously determined by the dental surgeon.

It follows, therefore, that if the guide cylinder 11 and its barrel 17 are suitably positioned with respect to an extended axis of the tooth 16 for preparation, the cutting bur 20 when orbitally rotated by the operator about the tooth 16 will perform a desired circumferential reduction of the tooth 16 if the offsetting of the bur 20 with respect to the axis of the barrel 17 is correctly chosen. The tooth reduction principally occurs on the height of contour of the tooth and the cingulum area 23. The tooth 16, therefore, will be cut by the bur 20 to approximately cylindrical form, and the gingival extension of the bur will ensure that a shoulder 24, square, bevelled or chamfered, will be simultaneously prepared around the gingival margin 25 of the tooth 16. Where, to produce a shoulder 24 of uniform width or for other reasons, such as to avoid damage to approximating teeth 26, further circumferential preparation is required on one or more faces of the tooth 16 and another barrel having a hole offset to a lesser extent from the barrel axis than the previous barrel 17 may then be substituted. The fresh plane of cut of the bur 20 will be parallel to the previous plane. If desired, several successive barrels 17 may be used, each progressively decreasing in degree of offsetting. Grooves and pin holes (not shown) as well as variation in gingival circumference may be obtained by the use of the drilling jig 10 together with the selection of appropriately offset barrels 17.

Although, a theoretically ideal preparation is constituted by circumferential reduction of cylindrical form, the slightly tapering construction of a bur 20 will cause a similar tapering effect in the circumferential preparation of the tooth 16. This slightly conical result is in fact desirable in practice for ease of fitting crowns while retaining sufficient frictional engagement with the reduced tooth 16. It will be found in practice that the drilling jig 10 can be held sufficiently firmly by its connecting overlay 15 within the bite of the patient 22, and that in many instances the provision of a single barrel 17 will be adequate for jacket crown preparation.

The jig 10 of this invention furthermore ensures accuracy in subgingival preparations so that optimum soft tissue coverage of the joint between the jacket crown and tooth 16 is obtained for ideal aesthetic results. To achieve this each slidable barrel 17 used with the jig 10 is provided with a radial pin 27 screwed into the outer wall thereof and protruding so as to contact the outer end 28 of the cylindrical sleeve 12. By appropriately contouring this sleeve end 28 it will function as a barrel cam with the radial pin 27 serving as a cam follower. Therefore, with rotation of the barrel 17 within its guide cylinder 11 the radial pin 27 will, if held against the contoured end 28 of the sleeve 12 cause the barrel 17 to advance and withdraw within the sleeve 12 during its rotation. This cam arrangement will precisely confine the gingival extension of the bur 20 relative to the jig 10 itself. The point of the bur 20 may thus be limited in movement to follow the gingival margin 25 of the tooth 16 and to provide the necessary subgingival shoulder 24.

Figure 5:
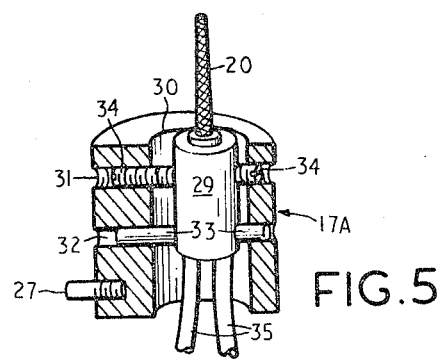
FIGURE 5 is a sectional perspective view of a modified form of barrel.
Figure 6:
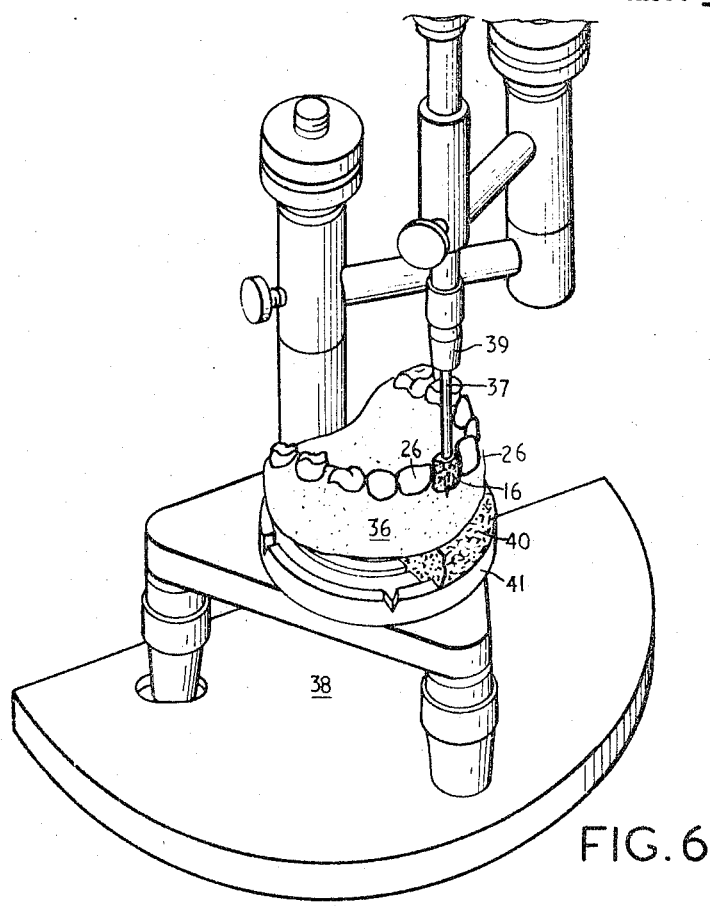
FIGURE 6 is a perspective view of a dental surveyor stand showing the initial stages of making the drilling jig.

A modified form of barrel 17A is shown in FIGURE 5. In this case a bur driving turbine 29 is mounted permanently within the barrel and provision is made for adjustably mounting the turbine 29 to a selected degree of axial offsetting with respect to the barrel 17A.

This is accomplished in the following manner. A radially elongated axial slot 30 is formed axially through the barrel 17A. Two transverse diametral parallel bores 31 and 32 are bored through the barrel 17A. The turbine 29 is accommodated in the slot 30 and a diametral pin 33 secured to the turbine 29, is slidably mounted in the bore 32.

The bore 31 is internally threaded and two set screws 34 are threadably engaged therein. By manipulation of the set screws 34, the radial off set of the turbine 29, with respect to the barrel 17A, can be adjusted as desired. The usual air and water connections 35 are provided for the turbine 29.

A further modified form of the barrel is shown in FIGURES 11, 12 and 13. This barrel 17B is provided with a radially offset bore 30A. An air driven turbine assembly 29A, fitted with a bur 20A, is adapted to nest in the bore 30A. The assembly 29A is composed of a cylindrical plug eccentrically housing a turbine motor. A short step 54 of reduced diameter is formed at the lower end of the assembly 29A. The lower end of the bore 30A is provided with an integral flange 55 (FIGURE 13). The step 54 engages the flange 55 when the assembly 29A is fully entered within the bore 30A and prevents the assembly from moving below the underside 56 of the barrel 17A.

The upper end of the assembly 29A is provided with an upstanding annular flange 57. A small slot 58 is formed in the flange 57 and a datum line 59 is etched in the centre of the slot 58.

The upper end 68 of the barrel 17B is provided with etched scale lines 61 which extend from the bore 30A to the outer periphery of the barrel 17B. A stepped ring 62 fits over the top 68 of the barrel 17B. A downwardly extending cam follower 63 is formed integrally with the rim of the ring 62. Rotation of the assembly 29A within the bore 30A will vary the degree of eccentricity of the bur 20A with respect to the axis of the barrel 17B. A tool 69 shown in FIGURE 11 is provided with a pegged end 70 which can be engaged with holes 71 in the top of the assembly 29A so that it can be adjusted by setting the datum line 59 opposite the required scale line 61.

In order to maintain the correct indexing of the cam follower 63 with respect to the bur 20A, the follower 63 must be relocated whenever the turbine assembly is reset. This is accomplished by aligning a further datum line 72 on the upper surface of the ring 62, with the outer end of the scale line 61, the inner end of which is already aligned with the turbine datum line 59.

Two cheese headed set screws 73 can be engaged with tapped holes 74 in the top 68 of the barrel 17B. When the screws 73 are screwed down they engage the ring 62 and the flange 57 of the assembly 29A and lock both ring and assembly in position. A screwdriver blade 75 is formed in the other end of the tool 69 and said blade 75 is used for tightening or loosening the screws 73.

It should now be appreciated that both circumferential as well as gingival preparation may be accurately controlled by the application of the drilling jig 10 of the invention in dentistry with a greatly reduced requirement for skill from the dental surgeon. Many other advantages accrue from its use to such an extent as to revolutionize the existing dental practices in preparation for jacket crowns and similar reconstructions. The present time-consuming construction in situ by surgeons of temporary crowns will no longer be necessary. A technician producing the drilling jig 10 will be able accurately to forecast the reduced form of the tooth 16, and even to construct a study cast of such form. A suitable temporary crown may then be formed by the technician and supplied to the surgeon with the drilling jig 10 prior to preparation commencing.

Whereas the above passages refer to the features of construction of the dental drilling jig 10, a further aspect of this invention, which is of considerable merit, concerns the method of producing a jig 10 of this kind. It is conceivable that other methods of production could be utilized, but that described hereafter is relatively simple and requires the use, at least partly, of commercial apparatus at present readily available to dental technicians. The necessary steps in the production method are set forth below with particular reference to FIGURES 6 to 10. Whereas, some of the following steps may require to be executed by a dental technician and others by the dental surgeon, himself, this will be immaterial to the actual steps to be followed in the production of the jig 10 which could, of course, be produced entirely by one person.

Firstly, an impression of the patient's mouth 21 is taken and from this a study cast 36 is obtained, preferably with the tooth 16 for preparation represented by a stone of one colour with the remainder of the cast 36 composed of a stone of a different colour. Upon the tooth 16 an orientation pin 37 is secured to indicate the selected path of insertion, or draw of preparation, to be followed in the future preparation work.

Figure 7:
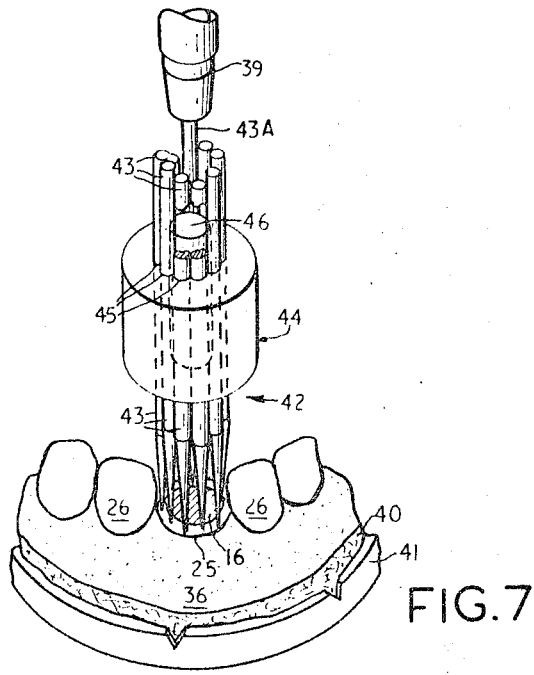
FIGURE 7 is a fragmentary perspective view of a pin array supported in the surveyor stand.

The cast 36 carrying the orientation pin 37 is placed upon a conventional dental surveyor device 38 with the pin 37 held within the chuck 39 of the device 38 and the cast 36 set to this position by a keyed base of plaster 40 poured between the base of the cast 36 and the table 41 of the surveyor 38. The tooth 16 in the cast 36 is then cut down, as shown in FIGURE 7, to about its gingival margin 25 to reveal quite clearly the junction between the different coloured stones.

The cast 36 with keyed base 40 is returned to the table 41 of the surveyor device 38 and a guide cylinder locating pin array 42 is positioned over the cut tooth cast 36. There will be available to the manufacturer a different array 42 of sharpened pins 43 corresponding to each slidable barrel 17 for the jig 10. An internally longitudinally fluted tube 44 of outside diameter corresponding to that of all the offset barrels 17 surrounds a cylindrical array 42 of pins 43 which are jammed into respective flutes 45 by a central core rod 46. One of the pins 43A is longer than the remainder 43 to serve as an alignment pin which may be accommodated at its root end within the surveyor chuck 39. The diameter of the circle of any pin array 42 will correspond with the circle circumscribed by the bur 20 connected to the respective barrel 17.

A selection is made from the available pin arrays 42 of that one whose pin points will closely encircle the gingival margin 25 of the tooth 16 for preparation, which is now represented by the cut-down tooth 16 in the study cast 36. Such a selection will then determine the actual barrel 17 to be used with the jig frame 10 for producing a subgingival shoulder 24 in the actual tooth preparation. Care will be required to be exercised in the selection of the appropriate pin array 42, but the degree of necessary skill will be negligible. In practice it has been found that correspondence of the offset barrels 17 to the pin arrays 42 requires no more than ordinary skill from a toolmaker. A stock of these barrels 17 and pin arrays 42 may be maintained by a dental technician to cover all contingencies.

Of course, any other suitable means for determining the degree of offsetting required for the bur 20 may be employed. A series of dummy barrels such as tubes 44 may be provided which have individual circular patterns of sight holes, each dummy barrel being paired as above with a corresponding working barrel 17. Alignment with the gingival margin 25 may then be achieved by sighting down the holes of the appropriate dummy barrel. Other relatively simple means of obtaining the most suitable offsetting of the bur 20 may be obvious to a reader, and any of such means may be included with the present method.

The next step in the production of the jig 10 is to secure by wax or other means the selected pin array 42 to the cast 36 in its encircling position of the tooth 16, for location purposes to permit the surveyor chuck 39 to be withdrawn. With reference to FIGURE 8, a tubular guide cylinder 11 of metal, plastic or other material is then placed around the pin array tube 44 and a cam sleeve 12 being a jam fit is placed over at least the outer end portion of the guide cylinder 11. Preferably, an autopolymerizing resin, and one that is fast cure, is applied as an overlay on the cast 36 and extends up and around at least portion of the outer cylindrical walls of the guide cylinder 11 and cam sleeve 12. With curing of the overlay a jig frame assembly of unitary construction is provided which with withdrawal of the pin array tube 44 will accurately relate with the cast 36 and subsequently with the patient's mouth 21.

A stylus scribing device 47, shown in FIGURE 9, which is comprised of a radial arm 48 carrying a stylus 49 and attached to a metal block 50 similar in dimension to the selected barrel 17 to be used with the jig 10 and through which downwardly extends a tracing pin 51 offset from the axis of the block 50 to a similar extent as the corresponding barrel 17. Rotation of the radial arm 48 of the stylus scribing device 47 around the sleeve cam 12 causes the stylus 49 to scribe out a circumferential line 52 about the sleeve 12. If the tracing pin 51 is permitted to follow the gingival margin 25 of the tooth 16 during rotation of the radial arm 48 the circumferential line 52 scribed on the sleeve 12 undulates in accordance with the gingival margin 25. The difference in level between the stylus 49 and the point of the tracing pin 51 is preferably a fixture in all instances and is exceeded by a small amount by the spacing between the point of the bur 20 and the cam follower 27 on the barrel 17 used with the completed jig 10. This small difference is predetermined and represents the subgingival depth of the prepared shoulder 24. The cam face 28 (see FIGURE 1) formed on the outer end of the cylinder sleeve 12 is cut to the scribed mark 52 to produce a contoured end on the sleeve 12. The actual extension of the bur 20 from its handpiece nozzle, or turbine motor housing, may be determined by a small recessed bur setting tool 53 which accommodates the bur 20 and reveals only that portion of its shank to be held within the nozzle of the handpiece 19, or the turbine motor.

It is intended, therefore, that a dental surgeon will be supplied with a drilling jig 10 produced individually for each patient 22 and each tooth 16 for preparation, together with a bur setting tool 53 and any additional handpiece 19, or turbine casing 29A, holding barrels 17 considered necessary for variations in preparation which might be required on the lingual or labial faces or the interproximal surfaces of the teeth. It has been found that with the use of the above method a jig 10 can be produced with a degree of accuracy within the limits of ±0.005 inch.

A drilling jig 10 prepared by the above or other suitable method and having the features hereinbefore specified is intended to be utilized by a dental surgeon in the following fashion.

The guide cylinder 11 and cam sleeve 12, which is contoured to the gingival contours and mounted in the locating frame 14 is supplied to the dentist from the laboratory and is firstly tried in the patient's mouth 21 for fit. It is essential that the frame 14 should fit accurately. Softened dental impression compound is now added to the frame and with it in place, the opposing teeth are closed lightly into the softened compound. This creates a firm bite prop which will hold the guide cylinder 11 accurately in its predetermined axis throughout the chairside procedures.

The laboratory's recommended barrel 17 is placed on the handpiece 19, or in the case of an assembled turbine as shown in FIGURE 5 or FIGURES 11 to 13, the offset setting recommended by the laboratory is selected. Using the bur setting tool 53 to provide the accurate length of bur or point extension, the recommended cutting tool 20 is placed in the handpiece 19 and secured. A pacer (not shown) may be placed on the radial pin 27 of the barrel 17 to be removed later to provide for subgingival extension. Using a conventional high speed handpiece 19 free-hand, the tooth 16 is reduced to the required final length of the jacket crown preparation. The barrel 17 and attached handpiece 19 or turbine 29 or 29A are then introduced into the guide cylinder 11 which is now held by the patient's occluding teeth. The dentist commences to cut to the gingival margin 25 at any part of the preparation he desires and continues reducing the tooth 16 as dictated by the cam sleeve 11 and guide cylinder 12. Provision must be made for adequate cooling and evacuation throughout these procedures.

When the barrel 17 of greatest offset has cut to its full depth, both axially and gingivally, the barrel 17 is removed and the recommended barrels 17 of smaller offset replace it in the recommended succession and the preparation of those parts of the tooth 16 to be reduced with these smaller barrels is then cut according to the predetermined specifications marked on the cam sleeve 11. Alternatively, of course, instead of replacing the barrel 17, an adjustment to the offsetting is made by the tool 69 of FIGURE 11.

The spacer is removed and the subgingival is now prepared. When all the areas of the tooth 16 have been reduced, the jig 10 is removed and the lingual surface is then prepared free-hand being guided by the requirements of the occlusion. Sharp corners and roughnesses are smoothed over with discs or stones. The shoulder is closely inspected for continuity and smoothness. The jig 10 may be replaced and corrections made.

Pin holes or grooves (not shown) are produced by selecting an appropriate barrel 17 with smaller offset and cutting vertically in the area to be grooved or pin-holed. The gingival depth of the groove or pin hole is controlled by the extension of the bur 20 from the handpiece 19.

What I claim is:

1. A drilling jig for use in the reduction of tooth structure of a dental patient and comprising a guide cylinder, a barrel rotatable and axially slidable in the guide cylinder, means for holding at least part of dental drilling apparatus in the barrel with a cutting bur of the apparatus extending in a line offset from the barrel axis, stationary cam means mounted with the guide cylinder, cam follower means carried with the barrel to limit axial sliding of the barrel within the guide cylinder thereby to control the maximum extension of the bur in all positions of rotation of the barrel, and frame means mounting the guide cylinder and cam means for accurate positioning of the jig within the patient's mouth.

2. A drilling jig according to claim 1, wherein the holding means for the dental drilling apparatus is a longitundinal bore through the barrel and securing means for holding the drilling apparatus therein.

3. A drilling jig according to claim 1, wherein the stationary cam means is a barrel cam formed by a sleeve fitted over at least one end portion of the guide cylinder to extend beyond said end portion and having its extending end suitably contoured to match the patient's gum line surrounding the tooth for treatment.

4. A drilling jig according to claim 1, wherein the frame means is of initially mouldable material and carries an impression of some of the teeth in the patient's jaw to which belongs the tooth for treatment, and is moulded around at least the guide cylinder to provide for said accurate positioning of the jig and rigidity of mounting when held within the bite of the patient's mouth.

5. A drilling jig according to claim 4, wherein the frame means is composed of an autopolymerizing resin receiving the teeth impressions from a cast of the patient's teeth and which has hardened before being applied to the mouth of the patient.

6. A drilling jig according to claim 5, wherein the dental drilling apparatus is the handpiece of an electrical dental drill, and a chuck on the handpiece to accept the bur.

7. A drilling jig for confining the movements of a cutting bur of dental drilling equipment corresponding to circumferential and gingival cutting of a tooth for preparation for fitting of a jacket crown, said jig comprising a disposable assembly of a guide cylinder, a stationary cam sleeve about and beyond one end of the guide cylinder and having its outer end contoured, and a frame of initially mouldable self-hardening material enclosing the guide cylinder and the cam sleeve and retaining an impression of the patient's teeth to either side of the tooth for treatment, said frame serving for accurate positioning of the assembly within the patient's mouth; said jig further comprising a rotatable and axially slidable barrel for the guide cylinder the bore of the barrel being offset to accommodate at least part of the dental drilling apparatus thereby controlling circumferential cutting by the bur, and cam follower means carried by the barrel and engageable with the contoured end of the cam sleeve to limit gingival cutting of the bur in all positions of its circumferential movement relative to the tooth under treatment.

8. A drilling jig according to claim 7, wherein the dental drilling apparatus is a bur driving turbine housed within the barrel, there being means for changing the spacing of the bur axis with respect to the barrel axis to effect variation of said bur offsetting, said changing means being set screws adjustable to move the turbine in a diametral line accross the barrel.

9. A drilling jig according to claim 7, wherein the dental drilling apparatus is a bur driving turbine housed eccentrically within a plug, said plug axis being also offset from the barrel axis, said offsetting of the bur being changeable by rotation of said plug within the barrel, and wherein there are means for adjustably rotating the cam follower around the barrel to enable the circumferential spacing of the cam follower from the bur of the turbine to be maintained constant whenever selective adjustment of the offsetting of the bur is effected.

10. A drilling jig according to claim 9, wherein the cam follower is connected to a rotatable ring encircling one end portion of the barrel, the plug is rotatable within an eccentric longitudinal bore in the barrel, there are a series of scale lines between the ring and the plug on the said one end of the barrel, and a datum line is provided on said ring and on said plug to ensure correct relative adjustment of the ring and cam follower whenever both datum lines are set to opposite ends of the same scale line.

11. A drilling jig according to claim 7 which is prepared from a cast of the teeth of one jaw of the dental patient entirely in the absence of said patient.

12. A method of producing a dental drilling jig comprising the steps of producing a study cast of the teeth of one jaw of the patient's mouth, orienting the cast on a surface to a predetermined path of insertion for intended tooth reduction, determining from the oriented cast the diameter of the desired circumferential cut of the cutting bur on the tooth to be treated, relating said determined diameter to the selection of a barrel providing for appropriate offsetting of the bur, locating a guide cylinder and stationary cam means with respect to the cast, applying mouldable self-hardening material around some of the teeth to either side of the tooth for treatment to receive and retain an impression of said teeth and around at least part of the guide cylinder to form a disposable assembly of unitary construction which may be accurately located within the mouth of the patient, scribing a contoured line around an outer portion of the cam means to represent the contour of the gingival margin of the tooth for treatment, removing the material of the cam means beyond the scribed line to produce an outer contoured end on the cam means, and inserting the said selected barrel within the guide cylinder for rotation and axial sliding therein.

13. The method according to claim 12, wherein said determination of said diameter is effected by selection of an appropriate one from an available number of guide cylinder locating pin arrays, said selection being made according to the matching of a pin array to the gingival margin of the tooth for treatment.

14. The method according to claim 13, wherein said location of the guide cylinder is effected by anchoring the selected pin array on the cast and sliding the guide cylinder over the pin array which pin array is removed after completion of the unitary assembly.

15. The method according to claim 14, wherein said orientation of the cast is achieved by securing an orientation pin to the cast at an angle representing the desired path of insertion for dental preparation of the teeth requiring treatment, holding the outer end portion of the pin in the chuck of dental surveyor apparatus to thereby support the cast at an angle with respect to the work table of the surveyor apparatus, and forming a base on the cast which will key the cast to the work table at said supported angle.

16. The method according to claim 15, wherein said scribing of the contoured line is effected by inserting a stylus scribing device having a cylindrical body rotatably into the guide cylinder.

References Cited

UNITED STATES PATENTS 3,363,489   1/1968   Heden _____ 32—67 XR

ROBERT PESHOCK, *Primary Examiner.*